(12) United States Patent
Booth et al.

(10) Patent No.: US 11,975,482 B2
(45) Date of Patent: May 7, 2024

(54) PRETREATED MATERIAL FOR LASER SINTERING

(71) Applicant: EOS of North America, Inc., Novi, MI (US)

(72) Inventors: Richard B. Booth, Bluffton, TX (US); Ryan A. Corbett, Temple, TX (US); Joseph Tucker, Pflugerville, TX (US)

(73) Assignee: EOS of North America, Inc., Novi, MI (US)

( * ) Notice: Subject to any disclaimer, the term of this patent is extended or adjusted under 35 U.S.C. 154(b) by 0 days.

(21) Appl. No.: 17/088,094

(22) Filed: Nov. 3, 2020

(65) Prior Publication Data
US 2022/0134642 A1 May 5, 2022

(51) Int. Cl.
| | |
|---|---|
| *B29C 64/153* | (2017.01) |
| *B29C 64/268* | (2017.01) |
| *B33Y 40/00* | (2020.01) |
| *B33Y 70/00* | (2020.01) |
| *C08L 23/12* | (2006.01) |
| *C08L 23/14* | (2006.01) |
| *B29K 23/00* | (2006.01) |
| *B33Y 10/00* | (2015.01) |

(52) U.S. Cl.
CPC .......... *B29C 64/153* (2017.08); *B29C 64/268* (2017.08); *B33Y 70/00* (2014.12); *C08L 23/12* (2013.01); *C08L 23/14* (2013.01); *B29K 2023/12* (2013.01); *B29K 2995/0039* (2013.01); *B29K 2995/004* (2013.01); *B29K 2995/0097* (2013.01); *B33Y 10/00* (2014.12); *B33Y 40/00* (2014.12)

(58) Field of Classification Search
CPC ....... B29C 64/153; B33Y 40/10; B33Y 70/00; C08L 23/10; C08L 23/12
See application file for complete search history.

(56) References Cited

U.S. PATENT DOCUMENTS

| | | | | |
|---|---|---|---|---|
| 3,862,069 A | * | 1/1975 | Cruz, Jr. ..................... | C08J 7/12 |
| | | | | 525/388 |
| 6,632,854 B1 | * | 10/2003 | Charlier ................. | C08F 287/00 |
| | | | | 522/119 |
| 8,142,886 B2 | * | 3/2012 | Noble ................... | A61L 27/446 |
| | | | | 623/23.76 |
| 9,580,551 B2 | * | 2/2017 | Vanelli ................... | B33Y 70/00 |
| 10,920,025 B2 | * | 2/2021 | Liu ......................... | B29B 13/02 |
| 2016/0215092 A1 | | 7/2016 | Vanelli et al. | |
| 2018/0355122 A1 | | 12/2018 | Liu et al. | |
| 2019/0039289 A1 | * | 2/2019 | Owens .................. | B29B 13/021 |
| 2020/0247010 A1 | | 8/2020 | Gorin et al. | |
| 2021/0403714 A1 | * | 12/2021 | Xu .......................... | C08L 77/06 |

FOREIGN PATENT DOCUMENTS

| | | | | | |
|---|---|---|---|---|---|
| CA | 2486940 C | * | 3/2011 | | |
| CN | 104031319 A | * | 9/2014 | ............. | B29C 67/00 |
| CN | 105585719 A | * | 5/2016 | ............... | C08J 3/14 |
| CN | 106146864 A | * | 11/2016 | ............. | B33Y 70/00 |
| CN | 106566066 A | * | 4/2017 | ............. | C08K 13/04 |
| CN | 106589418 A | * | 4/2017 | ........... | B29B 13/007 |
| CN | 107304251 A | * | 10/2017 | ............. | C08J 3/14 |
| CN | 107304270 A | * | 10/2017 | ............. | C08L 23/12 |
| CN | 107304270 A | * | 10/2017 | ............... | C08J 3/11 |
| DE | 4130135 C2 | * | 7/1999 | | |
| ES | 2815248 T3 | * | 3/2021 | | |
| JP | 2888625 B2 | * | 5/1999 | | |
| WO | WO-2013090174 A1 | * | 6/2013 | | |
| WO | WO-2020093855 A1 | * | 5/2020 | | |

OTHER PUBLICATIONS

CN 107304270 A (Oct. 31, 2017); machine translation. (Year: 2017).*
PCT Search Report and Written Opinion for Application No. PCT/EP2021/56034, dated Mar. 15, 2022, 12 pages.
Frontini et al., "The Effect of Annealing Temperature on the Fracture Performance of Isotactic Polypropylene," Journal of Materials Science, vol. 30, May 1995, p. 2446-2454.
Beck et al., "Glass Transitions in Polypropylene," SPE Transactions, vol. 3, issue 4, Oct. 1962, p. 279-285.
Ituarte et al., "Additive Manufacturing of Polypropylene: A Screening Design of Experiment Using Laser-Based Powder Bed Fusion," Polymers, vol. 10, Nov. 22, 2018, p. 1-16.
Farrow, "Crystallinity, Crystalite Size: and Melting Point of Polypropylene," Polymer, vol. 4, 1963, p. 191-197.

* cited by examiner

*Primary Examiner* — Rip A Lee
(74) *Attorney, Agent, or Firm* — Polsinelli (57) ABSTRACT

Disclosed is a composition, in particular to a building material for an additive manufacturing process, wherein the composition is treated by heat. Further, the present invention is directed to a process for the manufacturing of the inventive composition and to a device comprising the inventive composition and the use of the inventive composition.

10 Claims, 3 Drawing Sheets

PRETREATED MATERIAL FOR LASER SINTERING

TECHNICAL FIELD OF THE INVENTION

The present invention is directed to a composition, in particular to a building material for an additive manufacturing process, wherein the composition is treated by heat. Further, the present invention is directed to a process for the manufacturing of the inventive composition and to a device comprising the inventive composition and the use of the inventive composition.

BACKGROUND OF THE INVENTION

Additive manufacturing processes for the industrial production of prototypes and devices on the basis of powdery construction material allows for the manufacture of plastic articles and continually gain importance. By using the manufacturing processes, layers are selectively melted and solidified, respectively the desired structures are manufactured by applying a binder and/or adhesive. The process is also referred to as "additive manufacturing", "digital fabrication" or "three-dimensional (3D) printing".

Processes for industrial development for the manufacture of prototypes (rapid prototyping) are used since decades. However, by technologic progress of the systems, the production of parts to satisfy the qualitative requirements of final products instead of or additional to prototypes has started (rapid manufacturing), i. e. the technical progress of the systems now also allows the production of parts that meet the qualitative requirements for final products.

In practice, the term "additive manufacture" is often replaced by the term "generative manufacture" or "rapid technology". Processes which are encompassed by additive manufacturing to use powdery material are, e. g., sintering, melting or gluing by a binder.

Often, polymer systems are used as powdery materials for the manufacture of articles. Industrial users of such polymer systems request good processability, accuracy to shape and good mechanical properties of the articles manufactured by such systems.

For the purpose of the manufacturing of such articles, it is preferable for the melt temperature ("Tm") and the recrystallisation temperature ("Trc") of a powder to have a relatively large positive difference. If there is a relatively large positive difference between the two temperatures then it is easier to maintain an operating temperature that both keeps the fused powder partially molten and avoids partial melt of the remaining unfused powder during the manufacturing process. When the fused powder is kept partially molten the object being formed is less likely to warp or deform and in avoiding the partial melt of the remaining unfused powder, this powder can more easily be separated from the finished object.

Thus, during manufacture of 3D articles, a building temperature is required above crystallisation temperature of the polymer. On the other hand, in order for the powder cake to not melt in the building area, the building temperature is essentially required to be below melting temperature.

Generally, the temperature range applicable for building an object by additive manufacturing is named process window or sinter window of the polymer, respectively. In case of a significant overlap of crystallisation and melting of the polymer, such a polymer is most probably not suitable for additive manufacturing.

SUMMARY OF THE INVENTION

It is thus an object of the present invention, to foresee a composition being suitable for use as a material in an additive manufacturing process for the production of articles to exhibit a process-safe mechanical stability and a high accuracy of shape. In particular, it is an object of the present invention to provide a composition to exhibit an optimal process window and melting properties.

The present invention is thus directed to a composition, in particular to a building material for an above-mentioned additive manufacturing process, comprising at least one polymer, wherein the polymer is preferably in the form of a powder, and wherein the polymer comprises at least one thermoplastic polymer, wherein the at least one thermoplastic polymer is preferably selected from a polyetherimide, a polycarbonate, a polysulfone, a polyphenylene sulfone, a polyphenylene oxide, a polyether sulfone, an acrylnitrile-butadiene-styrol-copolymer (ABS), an acrylnitrile-styrol-acrylate-copolymer (ASA), a polyvinyl chloride, a polyacrylate, a polyester, a polyamide, a polypropylene, a polyethylene, a polyarylether ketone, a polyether, a polyurethane, a polyimide, polyamide imide, a polyolefine, a polyarylene sulfide and copolymers thereof, and wherein the polymer is treated by heat at a temperature of at least about 0.1° C. below the melting point and not more than about 2° C. below the melting point, and wherein the heat treatment is carried out for at least about 1 hour and/or not more than about 24 hours, preferably not more than about 12 hours, more preferably not more than about 8 hours.

In its simplest embodiment, an inventive composition comprises a polymer or a polymer system, respectively, being selected from a thermoplastic polymer.

The term "powder" as used herein refers to a bulk solid composed of fine particles that may flow freely when shaken or tilted. According to the present invention such fine particles have a particle size d50 of less than about 500 μm.

Surprisingly, such a heat treated composition exhibits improved properties with respect to the manufacturing process of devices or articles. Advantageously, such a composition has a larger process window, thereby allowing for the devices or articles to be completed successfully in a manufacturing process without disruption.

Even further, the advantageous composition exhibits superior flowability and melting properties and a homogenous structure of the bulk material, e. g. of a powder, to result in improved rheological characteristics such as viscosity, therefore allowing for improved material deposition and mechanical properties. Good flowability of a bulk material is assumed, when the bulk material is flowing free and easily.

Thus, by the inventive composition, there is no longer a limit on thickness of devices or parts of devices to be constructed or a limit on the height of a successful build. Therefore, devices or articles of any shape and size can be successfully produced.

The success of the heat treatment process can be displayed through the Differential Scanning calorimetry (DSC) curves of the material before and after heat treatment. Such a method, e. g. DIN EN ISO 11357, is known by the person skilled in the art Advantageously, by applying the present invention, the powder's melting and recrystallisation temperatures can be improved, e. g., by any one or combination of the following: (a) increasing a difference between the powder's Tm and Trc by increasing the powder's Tm; (b) increasing a difference between the powder's Tm and Trc by reducing the powder's Trc; (c) increasing the powder's melt onset temperature ("Tmo"); and (d) reducing the powder's recrystallisation onset temperature ("Tro"). The present invention may combine both points (a) and (c).

In addition, the difference between the Tmo and the Tm is reduced. Reducing this difference significantly improves the ability that none of the powder melts prematurely which would cause the remaining unfused powder to also partially melt and fuse together.

The term "melting temperature" (Tm) as used herein refers to a temperature or temperature range, at which a substance, preferably a polymer, copolymer or polymer blend passes from solid state to liquid state.

The term "recrystallisation temperature (Trc)" as used herein refers to a temperature or a temperature range at which a molten amorphous material changes to a crystalline material upon cooling.

The term "melt onset temperature (Tmo)" as used herein refers to a temperature temperature on the DSC curve where the tangent line of the melt event intersects the baseline.

The term "recrystallisation onset temperature (Tro)" as used herein refers to a temperature on the DSC curve where the tangent line of the recrystallization event intersects the baseline.

The term "about" or "approximately" (approx.) as used herein means that the specified number or range may vary up to 10-15%.

The term "flowability" as used herein is used synonymously to the term "pourability". Pourability of a powder is measured according DIN EN ISO 6186 using a mm funnel and/or by shear cell according to ASTM D 7891-15.

The term "polymer" or "polymer system" as used herein refers to at least one homo- and/or heteropolymer, being constructed from a number of monomers. While homopolymers comprise a covalent linkage of the same monomers, heteropolymers (also named copolymers) comprise different monomers with covalent linking. According to the present invention, a polymer or polymer system may comprise a mixture of the above-mentioned homo- and/or heteropolymers or may comprise more than one polymer system, respectively. In the present application, such a mixture is named polymer blend.

Within the context of the present invention, heteropolymers may be selected from statistic copolymers to comprise monomers with random allocation; from gradient copolymers being principally similar to statistic copolymers, in which, though, the content of a monomer within a chain increases or decreases; from alternate copolymers to comprise alternating monomers; from block copolymers or segment copolymers containing longer sequences or blocks of each monomer; and from graft copolymers, in which the block of each monomer is grafted onto the frame of a different monomer.

The "composition" as used herein may comprise one or more additive/s. The term "additive" as used herein refers to a substance which may be, in particular, an amorphous and/or semicrystalline and/or crystalline polymer, a polyol, a tenside and/or a protecting colloid.

Advantageously, the inventive composition can be used for additive manufacturing processes. Within the context of the present application, additive manufacturing processes comprise, in particular, processes which are suitable for the manufacture of prototypes (rapid prototyping) and articles (rapid manufacturing), preferably from the group of powder bed processes comprising laser sintering, highspeed sintering, multi-jet fusion, binder jetting, selective mask sintering or selective laser melting. In particular, the inventive composition can be used for laser sintering. The term "laser sintering" as used herein is similarly used to the term "selective laser sintering"; the latter one representing the older naming.

Further, the present invention is directed to a process for the manufacture of the inventive composition, wherein the process comprises the following steps:

(i) providing at least one thermoplastic polymer,
   wherein the polymer comprises at least one thermoplastic polymer,
   wherein the at least one thermoplastic polymer is preferably selected from a polyetherimide, a polycarbonate, a polysulfone, a polyphenylene sulfone, a polyphenylene oxide, a polyether sulfone, an acrylnitrile-butadiene-styrol-copolymer (ABS), an acrylnitrile-styrol-acrylate-copolymer (ASA), a polyvinyl chloride, a polyacrylate, a polyester, a polyamide, a polypropylene, a polyethylene, a polyarylether ketone, a polyether, a polyurethane, a polyimide, polyamide imide, a polyolefine, a polyarylene sulfide and copolymers thereof,
   and
(ii) treating the polymer by heat at a temperature of at least about 0.1° C. below the melting point and not more than about 2° C. below the melting point for at least about 1 hour and/or not more than about 24 hours, preferably not more than about 12 hours, particularly preferred not more than about 8 hours.
(iii) optionally grinding the polymer,
(iv) optionally rounding of the polymer particles, preferably by thermo-mechanical treatment, in a mixer), at a temperature of at least 30° C. and below the melting point Tm of the polymer.

The term "providing" as used herein refers to the manufacture of the polymer or polymer system taking place on site and/or, alternatively or additionally, the polymer or polymer system is supplied from an external site.

Preferably, grinding of the polymer pellets or polymerisation flakes from the polymerization process is performed to obtain polymer particles. Such polymerisation flakes are a coarse porous powder obtained from the polymerisation process.

Preferably, such a powder has a BET-surface of more than 1 m²/g. When using polymer pellets, such a grinding step is preferably conducted below room temperature, even more preferably by adding liquid nitrogen. Advantageously, the use of liquid nitrogen results in a higher yield of powder (of a certain particle size).

According to a particularly preferred embodiment, the polymer samples are ground to a powder with particle size d50 of at least 70 μm and/or not more than 90 μm, preferably of about 80 μm, in a cryogenic grinding process (Vortec, Impact Mill M-1).

In order to obtain particles of round shape, the polymer particles are treated, preferably by thermo-mechanical treatment. Such a treatment is performed in a mixer, preferably in a high-speed mixer, at a preferred temperature of at least 30° C. and below melting point Tm of the polymer.

As follows, the terms mixing, admixing, blending and compounding are used synonymously. A process of mixing, admixing, blending and compounding may be conducted by extrusion in an extruder, kneader, dispergator and/or in a stirrer and comprises, where appropriate, one or more operations such as melting, dispersing etc.

In case the inventive composition is to be packaged, such a packaging process is preferably conducted under exclusion of humidity or at defined humidity conditions, respectively.

A composition manufactured according to the inventive process is advantageously used as powder material to be solidified in a process for the layered manufacture of a three-dimensional object, whereby consecutive layers of the object are sequentially produced from the powder to be selectively solidified at predetermined sites by means of energy, preferably by means of electromagnetic radiation, particularly preferred by means of laser light.

Finally, the inventive composition is used for the manufacture of an object, in particular of a three-dimensional object, by layered application and selectively solidifying a construction material, preferably a powder. The term "solidifying" as used herein refers to an at least partial melting and subsequent solidification or re-solidification of the construction material, respectively and may also be named sintering.

An advantageous process for the manufacture of a construction element, preferably a 3D object, comprises at least the following steps:
(i) applying a layer of a composition according to the invention and/or a composition manufactured according to the inventive manufacturing process, preferably of a powder, onto a production panel,
(ii) selectively solidifying the applied layer of the composition at sites representing a cross section of the object to be manufactured, preferably by using an irradiation unit, and
(iii) lowering the carrier and repeating the steps for applying and solidifying until the construction element, preferably the 3D object, is finished.

The term "construction material" as used herein preferably refers to a powder or a powder material, which, by means of an additive manufacturing process, preferably by applying a powder bed based additive manufacturing process, in particular by means of laser sintering or selective laser melting; highspeed sintering; binder jetting such as multi jet fusion; selective mask sintering and laser pro fusion (during the latter solidification of the material is obtained by applying electromagnetic radiation) is suitably solidified to form construction elements or 3D objects, respectively. The above described inventive composition is particularly suited as construction material.

Preferably, the process or part of the process for the manufacture of a construction element, takes place under nitrogen atmosphere.

A production panel according to the present invention refers to a plate, placed on a carrier within a machine for additive manufacturing and being positioned in a predefined distance to a radiation unit, which is suitable for solidifying of the carrier material. The construction material is applied onto the panel such that its upper layer corresponds to the level to be solidified. The carrier may, during the course of construction, in particular during laser sintering, be adjusted such that the most recently applied layer of the construction material has the same distance to the radiation unit, preferably to the laser, thereby being solidified by exposure to the irradiation unit.

An article, in particular a 3D object, produced from the inventive composition exhibits an advantageous tensile strength and elongation at break. The term "tensile strength" as used herein refers to the measurement of the maximum force required to pull a material to the point of break. The determination of tensile strength is known to the person skilled in the art and may be measured according to DIN EN ISO 527. The term "elongation at break" as used herein refers to the ratio between changed length and initial length after breakage of a test specimen. It expresses the capability of a material to resist changes of shape without crack formation. The determination of the elongation at break may be, e. g., determined as to DIN EN ISO 527-2.

Further, a construction element manufactured from the inventive composition exhibits an improved dimensional stability and/or reduced distortion of shape. The term "dimensional stability" as used herein refers to the degree to which a material maintains its original dimensions when subjected to changes in temperature, pressure, force, altering or humidity. For the process of laser sintering, dimensional stability may be determined by means of distortion of shape of the construction element.

Also, the present invention is directed to a construction element, obtained or obtainable by the above described process of manufacture.

Use of the inventive composition may be realised by rapid prototyping as well as rapid manufacturing. Hereby, e. g., additive manufacturing processes, preferably from the group of powder bed processes comprising laser sintering, high-speed sintering, binder jetting, selective mask sintering, selective laser melting, in particular laser sintering, are implemented, to preferably produce threedimensional objects and selectively projecting a laser beam with a predetermined energy onto a layer of powder-like materials. By applying this process, prototypes and construction elements can be produced time- and cost-effectively.

The term "rapid manufacturing" as used herein in particular refers to the manufacture of construction elements, i. e. the production of more than one equal article, for which the production, e. g. by mold assembly, is not economic or is, due to geometric properties of the construction element otherwise more complex or not possible. This is true, over all, when the articles exhibit a complex shape. Examples are elements of high-class cars, racing or ralley cars, which are manufactured only in small numbers, or spare parts for motor sports, for which, beside small numbers, timing of availability are important. Industries, in which the inventive articles can be implemented, are, e. g. aerospace industry, medical engineering, mechanical engineering, automotive industry, sports industry, household goods industry, electro industry or lifestyle, respectively. Of further importance is the production of a number of similar construction elements, e. g., of personalised elements such as prosthesis, (inner ear) hearing devices and the like, for which the geometry can be individually adjusted to the user.

Finally, the present invention comprises a composition in the form of a powder material, suitable for solidifying in a process for the layered manufacture of a three dimensional object from such powder material, from which consecutive layers of the object are constructed subsequently at specific sites by applying energy, preferably by applying electromagnetic radiation, in particular by the application of laser light.

Further preferred embodiments of the invention are derived from the dependent claims together with the following description, whereby the patent claims of a certain category may be formed by dependent claims of a different category, and features of the different examples may be combined to new examples. It is to be understood that the definitions and explanations of the terms made above and below apply accordingly for all embodiments described in this specification and the accompanying claims. In the following, particular embodiments of the method of the present invention are specified further.

Preferably, the at least one polymer is selected from at least one homo- and/or heteropolymer and/or polymer blend, wherein the at least one homo- and/or heteropolymer and/or polymer blend preferably comprises a semicrystalline homo- and/or heteropolymer and/or amorphous homo- and/or heteropolymer. Particularly preferred, the at least one homo- and/or heteropolymer and/or polymer blend is selected from at least one semicrystalline polymer or semicrystalline polymer blend of at least one semicrystalline polymer and at least one further semicrystalline polymer or semicrystalline polymer blend of at least one semicrystalline polymer and amorphous polymer.

The term "semicrystalline" as used herein is understood as a substance which comprises crystalline and amorphous regions. A polymer is considered essentially amorphous, if the degree of crystallinity in the solid phase of the polymer is about 5 wt.-% or less, in particular about 2 wt.-% or less. In particular, a polymer is considered essentially amorphous, if, by dynamic differential calorimetry (DSC) no melting point can be determined and/or melt enthalpy is below 1 J/g in the first heat. A semicrystalline substance can contain up to 70 wt.-%, preferably up to 90 wt.-%, particularly up to 95 wt.-%, crystalline regions.

Preferably, the heteropolymer or copolymer, respectively, comprises at least two different repeat units and/or at least a polymer blend on the basis of the before mentioned polymers and copolymers. Advantageously, such a heteropolymer or copolymer and/or polymer blend is semicrystalline.

By using one or more of the above-mentioned polymers (homopolymers, copolymers or polymer blends) a material, preferably a powder material, can be produced, which is at least partly semicrystalline.

According to a preferred embodiment, the at least one thermoplastic polymer is selected from the group of Polypropylene (PP).

Polypropylene (PP, syn. Polypropen, Poly(1-methylethylen)) is a thermoplastic polymer manufactured by chain-polymerization of Propene. It belongs to the group of Polyolefines and is typically semicrystalline and nonpolar. Preferably, a semicrystalline Polypropylene comprises a random copolymer.

In principle, the Polypropylene may be atactic, syndiotactic and/or isotactic. In atactic Polypropylene the methyl group is random, in syndiotactic Polypropylene it is alternating and in isotactic Polypropylene it is distributed homogeneously. The distribution of the methyl group may influence crystallinity (amorph or semicrystalline) and thermic properties (such as glass transition temperature or melting temperature) of the PP. Tacticity is typically indicated by the degree of isotacticity (according to DIN 16774). Particularly preferred, the Polypropylene is an isotactic Polypropylene.

Further preferably, an at least one polymer blend of Polypropylene may comprise at least one Ethylene vinylacetate copolymer. Such a polymer blend advantageously exhibits an improved impact resistance, i. e. the ability to absorb impact energy without break.

In case an inventive composition comprises a polymer selected from a Polypropylene, in particular from an isotactic Polypropylene, such a Polypropylene may be preferably selected from a Polypropylene-Polyethylene copolymer.

Such a melting temperature and/or glass transition temperature of the at least one Polypropylene advantageously allows for improved melting and bonding properties, in particular for laser sintering, thus resulting in improved mechanical properties of the construction elements manufactured from such a polymer.

For an advantageous composition, Tmo is as close as possible to Tm. Preferably, by raising Tm, Tmo is also raised. Preferably, Tm is greater than the Tmo by no more than 12° C., more preferably by no more than 10° C., particularly preferred by no more than 8° C.

Alternatively or additionally, an advantageous composition comprises a polymer and/or copolymer and/or polymer blend having a glass transition temperature Tg of at least about −25° C., preferably of at least about −20° C. and/or not more than about −15° C., preferably not more than about −10° C.

The term "glass transition temperature" as used herein refers to the temperature, at which a polymer changes to a gum-like viscous state. The determination of the glass transition temperature is known to the person skilled in the art and may be performed, e. g., by DSC (according to DIN EN ISO 11357).

According to a preferred embodiment, an advantageous composition has a process window of at least about 10° C., preferably at least about 15° C., more preferably at least about 18° C. and/or not more than about 50° C., preferably not more than about 45° C., more preferably not more than about 40° C.

According to a particularly preferred embodiment, the at least one thermoplastic polymer is treated by heat to increase a difference between the melting temperature and the recrystallisation temperature, and/or the at least one thermoplastic polymer is treated by heat to increase a temperature at which onset of melting occurs for the at least one polymer.

According to a preferred embodiment an advantageous composition has an extrapolated starting temperature of the melting peak $T_{eim}$, which is increased by at least 1° C., preferably by at least 5° C., in comparison to a thermoplastic polymer which is not treated by annealing and/or a difference of $\Delta T_{eim}/Tc$ of the crystallisation temperature (Tc) and the melting temperature (Tm), which is increased by at least 1° C., preferably by at least 5° C.

Annealing of the composition may advantageously result in an increase of $T_{eim}$ and/or increase of the difference $\Delta T_{eim}/Tc$, i. e., causes an increase of the process window. As mentioned above, generally, the temperature range applicable for building an object by additive manufacturing is named process window or sinter window of the polymer, respectively. In particular, the term "process window" as used herein refers to the difference between the lowest possible building temperature (non-curl temperature: NCT) and the highest possible building temperature (upper building temperature: UBT). The terms "crystallisation temperature" and "extrapolated starting temperature of the melting peak" as used herein refer to the peak temperatures as defined in DIN EN ISO 11357.

Methods for the determination of the crystallisation or recrystallisaton temperature, the melting temperature, the temperature of melting onset and the extrapolated starting temperature of melting peak are known by the person skilled in the art and may be conducted by means of dynamic differential calorimetry (DSC) as to DIN EN ISO 11357. In order to allow for a comparison of the measurements of the polymers with or without annealing treatment, the used methods take into account to apply the same holding times, heat rates, start temperature and end temperature.

The degree of crystallisation may be measured by various analytical methods, such as DSC or X-ray diffraction. Hereby, the degree of crystallisation is calculated by the melting enthalpy [J/g] (in comparison to a polymer having a theoretic crystallinity of 100%).

The term "melting enthalpy" as used herein refers to the energy, necessary to melt a substance at its melting temperature and at constant pressure (isobar) from its solid state to its liquid state.

According to a particularly preferred embodiment, treatment by heat of the at least one thermoplastic polymer is performed in an inert atmosphere, optionally at a specified pressure. The specified pressure is substantially higher than atmospheric pressure at sea level. Further preferred the at least one thermoplastic polymer has been treated by heat at a specified pressure under inert gas atmosphere, preferably nitrogen.

As mentioned above, the advantageous composition may comprise one or more additive/s. According to a preferred embodiment, the additive may be a semicrystalline polymer and/or a semicrystalline polyol and/or a semicrystalline tenside and/or a semicrystalline protective colloid. Preferably, the additive is water soluble and/or not miscible with the at least one thermoplastic polymer at room temperature.

Advantageously, the additive suitably prevents caking of the polymer particles and formation of cavities during pouring of the composition during the additive manufacturing process, thereby positively increasing bulk density of the composition.

The term "bulk density" as used herein refers to the mass of many particles of the material divided by the total volume they occupy. The total volume includes particle volume, interparticle void volume, and internal pore volume. The determination of bulk density is known to the person skilled in the art and may be conducted according to DIN EN ISO 60:2000-01.

According to a preferred embodiment, the composition has a bulk density of at least about 0.20 g/cm$^3$ and/or not more than about 0.45 g/cm$^3$, preferably of at least 0.25 g/cm$^3$ and/or not more than 0.40 g/cm$^3$, in particular of at least 0.28 g/cm$^3$ and/or not more than 0.35 g/cm$^3$.

Generally, for a composition used for laser sintering, a particular particle size or particle size distribution, respectively, a suitable bulk density and sufficient pourability is of importance.

The term "particle size" as used herein refers to the size of single particles in the composition. Hereby, the particle size distribution has an influence on the properties of a bulk material, present in a pourable form, such as a composition present in powder form.

According to a further preferred embodiment, the polymer particles of the composition have a particle size distribution as follows:
d10=at least 30 µm, preferably at least 35 µm and/or not more than 50 µm, preferably not more than 45 µm
d50=at least 70 µm, preferably at least 75 µm and/or not more than 90 µm, in particular not more than 85 µm
d90=at least 90 µm, preferably at least 100 µm and/or not more than 120 µm, in particular not more than 110 µm.

Methods for the determination of particle- or particle size distribution, respectively, are known to the person skilled in the art and may be determined according to DIN ISO 13322-2.

According to a further preferred embodiment, an advantageous composition exhibits a distribution width (d90-d10)/d50 of at least 0.50, preferably of at least 0.60, particularly preferred of at least 0.65 and/or not more than 1.2, preferably of not more than 1.1, particularly preferred of not more than 1.

A further preferred composition comprises a fine content of not more than about 5 wt.-%, preferably of not more than about 3 wt.-%, particularly preferred of not more than about 2 wt.-% and mostly preferred of not more than 1 wt.-%. The term "fine content" as used herein refers to particles having a particle size of less than 10 µm.

The polymer particles of the inventive composition preferably exhibit an essentially spherical to lenticular shape. Particularly preferred, the polymer particles exhibit a sphericity of at least about 0.8, preferably of at least about 0.85, particularly preferred of at least about 0.86 and mostly preferred of at least about 0.87. Determination of sphericity may be, e. g., performed by microscopy according to DIN ISO 13322-1 and/or according to DIN ISO 13322-2 (on a Camsizer XT device (Retsch Technology, Germany)).

The inventive process for the manufacturing of the composition has been illustrated initially. According to a further preferred embodiment for the manufacture of the composition, the polymer is preferably selected from a polypropylene or its copolymers or blends with other polymers, more preferably in the form of a powder. Particularly preferred, the polymer is a grinded polymer.

The dispersion step, preferably the melt dispersion, is conducted in a dispersion apparatus, more preferably in an extruder. Alternatively, the dispersion step, may be conducted in a kneader. Preferably, the dispersion apparatus comprises, particularly in advance direction, several consecutive zones.

In a further process a separation of the polymer or polymer particles, respectively, from the mixture or the dispersion may be followed by a washing and/or drying step of the separated polymer or polymer particles.

A separation of the components of the mixture or the dispersion, respectively, is preferably performed by centrifugation and/or filtration. A drying of the solid composition to obtain the dried composition can be realised, e. g., in an oven such as a vacuum drier.

Alternatively or additionally, an advantageous composition can be obtained by melt compounding of the polymer as provided in step i), further processing the polymer by spinning a fibre and chopping the fibre to micro-pellets.

Alternatively or additionally, an advantageous composition can be obtained by melt compounding the polymer as provided in step i) and spraying the melt in a melt spraying process, preferably by applying high pressure through a nozzle.

Alternatively or additionally, an advantageous composition can be obtained by dissolving the polymer in a solvent, preferably at elevated temperature, and precipitating the polymer from the solvent in order to form of a powder, preferably by cooling and stirring.

According to a particularly preferred embodiment, the advantageous process for the manufacture of a composition further comprises a (subsequent) step of annealing the polymer particles at a temperature above Tg and below Tm. Preferably, annealing of the polymer particles, is conducted in a furnace.

The annealing step may be performed in the same step as the above described rounding step. Alternatively, annealing may be performed before or even after rounding of the polymer particles.

Also, the present invention is directed to a composition, in particular to a composition comprising a Polypropylene polymer, obtained or obtainable by an above described process to comprise such an annealing step.

In a next step, an advantageous process comprises the addition of an additive. In particular, such an additive is selected from a flow agent. Preferably, addition of the additive, in particular of the flow agent, is performed in a mixer.

Also, the present invention encompasses a construction element, preferably a 3D object, wherein the construction element is obtained or obtainable by an above described manufacturing process.

Finally, an advantageous process may comprise packaging of the composition. Packaging of a composition manufactured according to the inventive process, in particular of a powder, is preferably performed under exclusion from air humidity. Such a packed material may be stored under reduced humidity to prevent from caking effects, thereby improving storage stability of the inventive composition. In addition, an advantageous packaging material may prevent from access of humidity, in particular from air humidity, to the inventive composition.

As mentioned above, the inventive compositions are suitable for additive manufacturing processes, in particular for laser sintering processes. Thereby, energy absorbing and/or energy reflecting substances may be applied onto the target area of the irradiation unit, such as known from processes of highspeed sintering or multi-jet fusion, respectively.

It has been found further, that determination of tensile strength and elongation at break are useful as a measure for processability of the inventive composition or the construction elements, respectively, manufactured herefrom.

Accordingly, a further preferred embodiment encompasses a construction element produced by using the inventive composition. Advantageously, such a construction element preferably exhibits a tensile strength in x-y direction of at least about 10 MPa, more preferably of at least about 15 MPa, in particular of at least about 20 MPa. An advantageous construction element preferably has a tensile strength of not more than about 35 MPa, more preferably of not more than about 30 MPa, in particular of not more than about 25 MPa.

Alternatively or additionally, such a construction element preferably exhibits an elongation at break of at least about 20%, more preferably of at least about 25%, in particular of at least about 30%, and/or preferably not more than about 60%, more preferably of not more than about 55%, particularly preferred of not more than about 50%.

The determination of tensile strength and elongation at break is known to the person skilled in the art and may be performed according to DIN EN ISO 527.

According to a further preferred embodiment, an advantageous composition comprises at least an additive which is preferably selected from one or more flow agents, heat stabiliser, oxidation stabiliser, UV stabiliser, colorants, infrared absorbers. A preferred content of such an additive in a composition might be at least about 0.005 wt.-%, preferably at least about 0.01 wt.-%, more preferably at least about 0.05 wt.-%, particularly preferred at least about 0.1 wt.-%, most preferably at least about 0.2 wt.-%, and/or the preferred composition may comprise a content of the one or more additive/s of preferably not more than about 3 wt. %, more preferably of not more that about 2 wt.-%, particularly preferred of not more than about 1 wt.-%, most preferably of not more than about 0.5 wt.-%. A content of such an additive refers to the content of each single additive in the composition.

Other functional additives which can be used preferably in higher amounts of more than 3 wt.-% are selected from the group of softeners, fillers and reinforcing materials and flame retardants like, reinforcing fibers, $SiO_2$ particles, carbon particles, carbon fibres, glass fibres, carbon nanotubes, mineral fibres (e. g. Wollastonit), aramide fibres (in particular Kevlar fibres), glass spheres, mineral fillers, inorganic and/or organic pigments and/or flame retardents (in particular containing phosphate such as ammonium polyphosphate and/or brome and/or other halogens and/or anorganics such as magnesium hydroxide or aluminium hydroxide). Particularly preferred, the additive comprises a reinforcing fibre, in particular a carbon fibre.

Further particularly preferred additives comprise polysiloxanes. Polysiloxanes may be used, e. g. as flow agents to reduce viscosity of the polymer melt and/or in particular as softener in polymer blends.

According to a further preferred embodiment, an advantageous composition comprises at least one flow agent. Such a flow agent, usually present in the form of particles, attaches to the polymer particles, thereby preventing clumping of the composition.

Such a flow agent is preferably selected from the group of metal soaps, preferably from silicon dioxide, stearate, tricalcium phosphate, calcium silicate, aluminium oxide, magnesium oxide, magnesium carbonate, zink oxide or mixtures thereof. More preferably, the at least one flow agent is selected from silicon dioxide (syn. silica). An advantageous composition comprises at least about 0.01 wt.-% and/or not more than about 1 wt.-% of flow agent/s.

BRIEF DESCRIPTION OF THE DRAWINGS

Further characteristics of the present invention are derived from the examples in combination with the claims and the figures. Single features may be, in a particular embodiment, realised in combination with other features and do not limit the scope of protection of the present invention. The following description of the examples according to the invention may relate to the figures, whereby

DETAILED DESCRIPTION OF THE EMBODIMENTS

EXAMPLES

Figure 1:
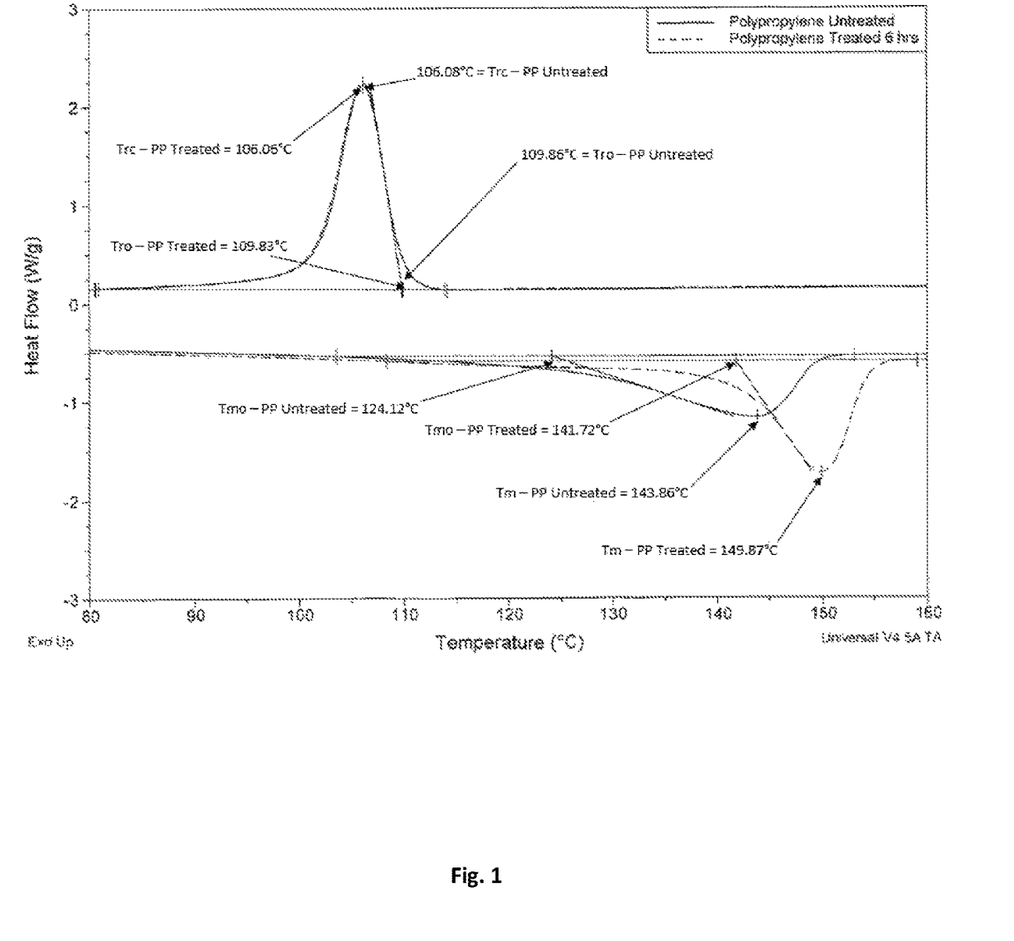
FIG. 1 shows the DSC curves for the untreated and treated Polymer 05 pellets (heat treatment 142° C. for 6 hrs). There is a clear increase in both the Tmo and Tm of the material as well as a reduction in the difference between the Tmo and Tm.
Figure 2:
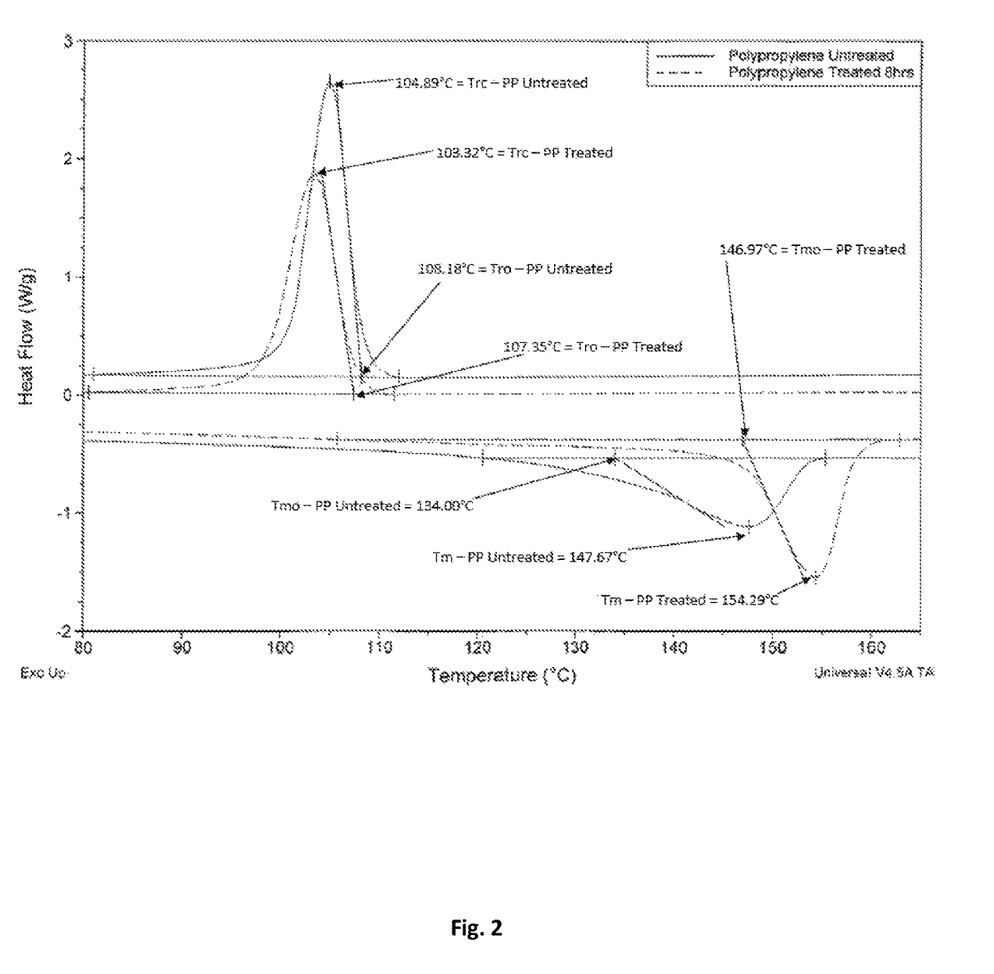
FIG. 2 shows the DSC curves for the untreated and treated Polymer 09 pellets (heat treatment 147° C. for 8 hrs). Increases to the Tmo and Tm as well as a reduction in the difference between the Tmo and Tm are displayed.
Figure 3:
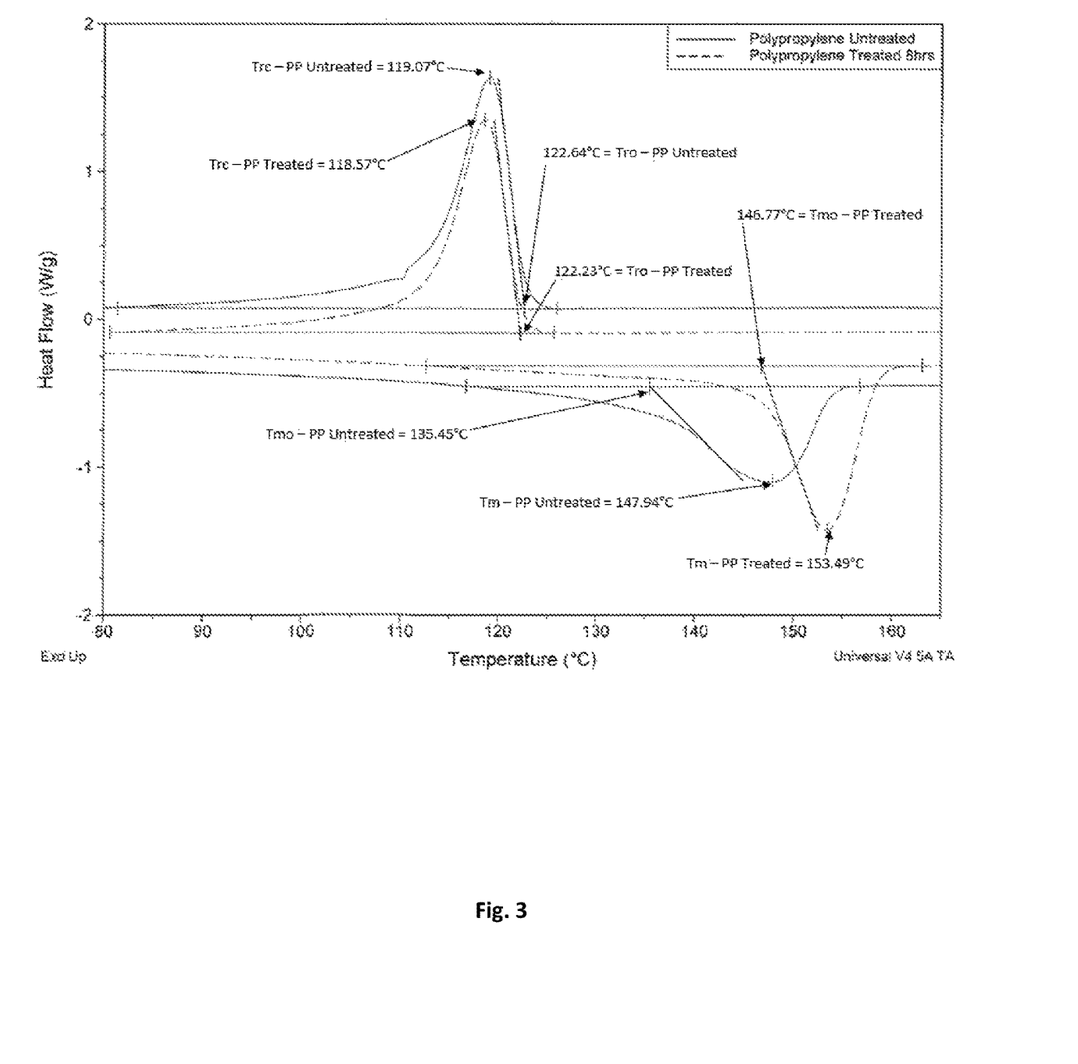
FIG. 3 shows the DSC curves for the untreated and treated Polymer 18 pellets (heat treatment 147° C. for 8 hrs). Increases to the Tmo and Tm as well as a reduction in the difference between the Tmo and Tm are displayed.

Materials:
  a) Polymer 05 (Braskem, Polypropylene pellets)
  b) Polymer 09 (Braskem, Polypropylene pellets)
  c) Polymer 18 (Braskem, Polypropylene pellets)
Heat Treatment:
The polymer samples listed above were heated in a heating device (Grieve, Truck Oven TCH-550). The optimal heating parameters for each polymer sample were as follows:
  (1) Polymer 05 was heated to a temperature of 142° C. for 6 hours, (2) Polymer 09 was heated to a temperature of 147° C. for 8 hours, and (3) Polymer 18 was heated to a temperature of 147° C. for 8 hours.

Temperature Measurements by DSC:

The temperature measurements for all samples listed above were produced according to ASTM D3418-03 (Standard Test Method for Transition Temperatures and Enthalpies of Fusion and Crystallisation of Polymers by Differential Scanning calorimetry) with a TA Instruments TA Q20 DSC tool.

For the evaluation of the Tm, the Trc and the onset points Tmo and Tro, standard aluminum pans were used and the heating and cooling was performed for all samples as follows: (1) equilibrating at 40° C., (2) ramping at 10° C./min to 175° C., (3) holding isothermal for 1 minute, (4) ramping at −10° C./min to 40° C., (5) holding isothermal for 1 minute.

The melting point of polypropylene in general can range between 120–170° C.

TABLE 1

Melt and recrystallisation data for various heat treated Polymer 05 samples.

| Sample | Melting Peak ("Tm") | Melting Onset ("Tmo") | Recrystallisation Peak ("Trc") | Recrystallisation Onset ("Tro") |
|---|---|---|---|---|
| Polymer 05 Control Sample, Untreated | 143.86° C. | 124.12° C. | 106.08° C. | 109.86° C. |
| Polymer 05, heat treated 6 hours at 142° C. | 149.87° C. | 141.72° C. | 106.06° C. | 109.83° C. |
| Polymer 05, heat treated 16 hours at 128° C. | 143.44° C. | 130.33° C. | 107.22° C. | 111.33° C. |
| Polymer 05, heat treated 16 hours at 131° C. | 144.83° C. | 132.01° C. | 107.30° C. | 111.53° C. |
| Polymer 05, heat treated 14 hours at 135° C. | 145.23° C. | 136.35° C. | 107.57° C. | 111.54° C. |

TABLE 2

Melt and recrystallisation data for various heat treated Polymer 09 samples.

| Sample | Melting Peak ("Tm") | Melting Onset ("Tmo") | Recrystallisation Peak ("Trc") | Recrystallisation Onset ("Tro") |
|---|---|---|---|---|
| Polymer 09 Control Sample, Untreated | 147.67° C. | 134.00° C. | 104.89° C. | 108.18° C. |
| Polymer 09, heat treated 8 hours at 147° C. | 154.29° C. | 146.97° C. | 103.32° C. | 107.35° C. |

TABLE 3

Melt and recrystallisation data for various heat treated Polymer 18 samples.

| Sample | Melting Peak ("Tm") | Melting Onset ("Tmo") | Recrystallisation Peak ("Trc") | Recrystallisation Onset ("Tro") |
|---|---|---|---|---|
| Polymer 18 Control Sample, Untreated | 147.94° C. | 135.45° C. | 119.07° C. | 122.64° C. |
| Polymer 18, heat treated 8 hours at 147° C. | 153.49° C. | 146.77° C. | 118.57° C. | 122.23° C. |

Grinding

The polymer samples are then optionally ground to a powder with particle size d50 of 80 μm in a cryogenic grinding process (Vortec, Impact Mill M-1).

Laser Sintering

Now that the polymer samples are in powder form they can be used in the SLS machines (Integra, Sinterstation 2500 Plus) and (EOS, P396).

The invention illustratively described herein suitably may be practised in the absence of any element or elements, limitation or limitations which is/are not specifically disclosed herein. Thus, for example, in each instance herein any of the terms "comprising", "consisting essentially of" and "consisting of" may be replaced with either of the other two terms. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

All references cited in this specification are herewith incorporated by reference with respect to their entire disclosure content and the disclosure content specifically mentioned in this specification.

The invention claimed is:

1. A composition comprising:
   at least one polymer in the form of a dry powder,
   wherein the at least one polymer comprises at least one thermoplastic polymer selected from the group consisting of a polyetherimide, a polycarbonate, a polysulfone, a polyphenylene sulfone, a polyphenylene oxide, a polyether sulfone, an acrylnitrile-butadiene-styrol-copolymer (ABS), an acrylnitrile-styrol-acrylate-copolymer (ASA), a polyvinyl chloride, a polyacrylate, a polyester, a polyamide, a polypropylene, a polyethylene, a polyarylether ketone, a polyether, a polyurethane, a polyimide, polyamide imide, a polyolefine, a polyarylene sulfide and copolymers thereof;
   wherein the at least one polymer is treated by heat at a temperature of at least about 0.1° C. below a melting point of the at least one polymer and not more than about 2° C. below the melting point;

wherein the heat treatment is carried out in a dry state of the powder for at least about 1 hour and/or not more than about 24 hours; and wherein the at least one polymer has polymer particles with a particle size distribution as follows:
d10=at least 30 µm and/or not more than 50 µm;
d50=at least 70 µm and/or not more than 90 µm; and
d90=at least 90 µm and/or not more than 120 µm.

2. A composition according to claim 1, wherein the at least one polymer comprises at least one semicrystalline polymer and/or at least one amorphous polymer.

3. A composition according to claim 1, further comprising a polypropylene and/or a copolymer and/or a polymer blend thereof.

4. A composition according to claim 1, wherein the polypropylene has a melting temperature $T_m$, of at least about 100° C., and/or wherein the polypropylene has a glass transition temperature $T_g$ of at least about −25° C.

5. A composition according to claim 2, having a process window of at least about 10° C.

6. A composition according to claim 1, further comprising at least one flow agent.

7. A process for the manufacture of a composition according to claim 1, wherein the process comprises the following steps:
providing the at least one thermoplastic polymer selected from the group consisting of a polyetherimide, a polycarbonate, a polysulfone, a polyphenylene sulfone, a polyphenylene oxide, a polyether sulfone, an acrylnitrile-butadiene-styrol-copolymer (ABS), an acrylnitrile-styrol-acrylate-copolymer (ASA), a polyvinyl chloride, a polyacrylate, a polyester, a polyamide, a polypropylene, a polyethylene, a polyarylether ketone, a polyether, a polyurethane, a polyimide, polyamide imide, a polyolefine, a polyarylene sulfide and copolymers thereof; and
treating the at least one polymer by heat in a dry state of the powder at a temperature of at least about 0.1° C. below the melting point and not more than about 2° C. below the melting point for at least about 1 hour and/or not more than about 24 hours.

8. A process for the manufacture of a composition according to claim 7, wherein the process comprises the following steps:
treating the at least one thermoplastic polymer by heat to increase a difference between a melting temperature and/or an onset melting temperature and a recrystallisation temperature and/or onset recrystallisation temperature; and/or treating the least one thermoplastic polymer by heat to increase a temperature at which onset of melting occurs.

9. A composition comprising:
at least one polymer in the form of a dry powder,
wherein the at least one polymer comprises at least one thermoplastic polymer selected from the group consisting of a polyetherimide, a polycarbonate, a polysulfone, a polyphenylene sulfone, a polyphenylene oxide, a polyether sulfone, an acrylnitrile-butadiene-styrol-copolymer (ABS), an acrylnitrile-styrol-acrylate-copolymer (ASA), a polyvinyl chloride, a polyacrylate, a polyester, a polyamide, a polypropylene, a polyethylene, a polyarylether ketone, a polyether, a polyurethane, a polyimide, polyamide imide, a polyolefine, a polyarylene sulfide and copolymers thereof;
wherein the at least one polymer is treated by heat at a temperature of at least about 0.1° C. below a melting point of the at least one polymer and not more than about 2° C. below the melting point;
wherein the heat treatment is carried out in a dry state of the powder for at least about 1 hour and/or not more than about 24 hours; and
wherein the composition has a particle distribution width (d90−d10)/d50 of at least 0.50.

10. A composition comprising:
at least one polymer in the form of a dry powder,
wherein the at least one polymer comprises at least one thermoplastic polymer selected from the group consisting of a polyetherimide, a polycarbonate, a polysulfone, a polyphenylene sulfone, a polyphenylene oxide, a polyether sulfone, an acrylnitrile-butadiene-styrol-copolymer (ABS), an acrylnitrile-styrol-acrylate-copolymer (ASA), a polyvinyl chloride, a polyacrylate, a polyester, a polyamide, a polypropylene, a polyethylene, a polyarylether ketone, a polyether, a polyurethane, a polyimide, polyamide imide, a polyolefine, a polyarylene sulfide and copolymers thereof;
wherein the at least one polymer is treated by heat at a temperature of at least about 0.1° C. below a melting point of the at least one polymer and not more than about 2° C. below the melting point;
wherein the heat treatment is carried out in a dry state of the powder for at least about 1 hour and/or not more than about 24 hours; and
wherein the at least one polymer has polymer particles with a sphericity of at least about 0.8.

* * * * *